United States Patent [19]

Andrevski

[11] Patent Number: 4,591,901

[45] Date of Patent: May 27, 1986

[54] TELEVISION CAMERA WITH SOLID-STATE IMAGERS MOUNTED TO A PRISM

[75] Inventor: Zygmunt M. Andrevski, Princeton Township, Mercer County, N.J.

[73] Assignee: RCA Corporation, Princeton, N.J.

[21] Appl. No.: 595,528

[22] Filed: Mar. 30, 1984

[51] Int. Cl.$^4$ .................. H04N 9/09; H04N 9/093; H04N 9/097; G02B 27/14

[52] U.S. Cl. .......................... 358/50; 358/51; 358/55; 350/173

[58] Field of Search ............ 358/50, 51, 52, 55; 350/173

[56] References Cited

U.S. PATENT DOCUMENTS

4,268,119 5/1981 Hartmann .................... 358/55
4,323,918 4/1982 Bendell ...................... 358/50

Primary Examiner—Michael A. Masinick
Assistant Examiner—Randall S. Svihla
Attorney, Agent, or Firm—Eugene M. Whitacre; William H. Meise; Lawrence C. Edelman

[57] ABSTRACT

A mounting asembly is described for mounting at least one image transducing means to a light output port of a light- or color-splitting prism. First and second mounting plates are bonded to opposite sides of the prism which are orthogonal to the plane of the light output port. Cut-outs are located within the periphery of the mounting plates at areas adjacent the light output ports of the prism. Support bars have a central portion which is bonded to support the image transducing means while the end portions are bonded to the cut-outs of the mounting plates.

29 Claims, 11 Drawing Figures

TELEVISION CAMERA WITH SOLID-STATE IMAGERS MOUNTED TO A PRISM

This invention relates to a television camera including a light-splitting prism and more particuarly to the mounting of solid-state imagers to such a prism.

Television cameras using single image pick-up tubes for converting images into image representative television signals have long been used. More recently, color television cameras have been used which include light-splitting prisms for dividing the incoming light, for example, into red, green and blue color components. When such a prism is used, the prior-art television camera also used image pick-up tubes. Such tube-type cameras are heavy, consume a great deal of power by comparison with solid-state imagers, and they have a relatively short life. Thus, frequent tube replacement and/or readjustment of tube drive circuits is required.

The introduction of solid-state imagers has obviated many of these problems, notably the problems of weight, size, power and life. It is known to use a single solid-state imager to produce a monochrome television picture, to use a single solid-state imager together with a color filter to produce encoded color-representative television signals, and, as in tube practice, it is known to use a color-splitting prism in conjunction with solid-state imagers, such as described in U.S. Pat. No. 4,323,918 issued Apr. 6, 1982, in the name of Bendell. As mentioned in the Bendell patent, the long life of the solid-state imagers makes it possible to adhesively attach the solid-state imagers to the light output ports of the color-splitting prism. Such color-splitting prisms are formed from blocks of optical glass which include surfaces which interface with a predetermined narrow air gap therebetween. Because of the narrow air gap, the various optical glass blocks can be attached to each other only in a narrow region about the periphery of the interface area. This results in a relatively weak attachment which may break when subjected to a force resulting in separation of the optical blocks and destruction of the prism's light splitting property. Such forces are very possible during camera manufacture, for example, when manipulators are used to attach the solid-state imagers to the faces or light output ports of the prism, during the glueing process, and during those times when leads are connected to the solid-state imagers attached to the faces of the prism. Additionally, when such a prism assembly is used in a portable television camera, normal environmental conditions such as abrupt temperature changes and sudden shocks to the case of the portable television camera exert forces upon the prism assembly which may break the prism at the weak interface areas. It is desirable to have a mounting arrangement for the prism and its imagers which aids in the structural integrity of the prism and the prism-imager assembly, thereby reducing the incidence of breakage.

SUMMARY OF THE INVENTION

A mounting assembly for use in mounting at least one image transducing means to view a light output port of the light-splitting prism is provided including first and second mounting plates securely attached to opposite sides of the prism which plates are orthogonal to the plane of the narrow air gap between the optical blocks of the prism. First and second alignment means are located about the periphery of the mounting plates and are adjacent to the light output port of the prism. A support means having first and second ends coupled to the first and second alignment means, respectively, physically support the image transducing means external to the prism and in the optical path of the light output port.

DESCRIPTION OF THE INVENTION

Figure 1:
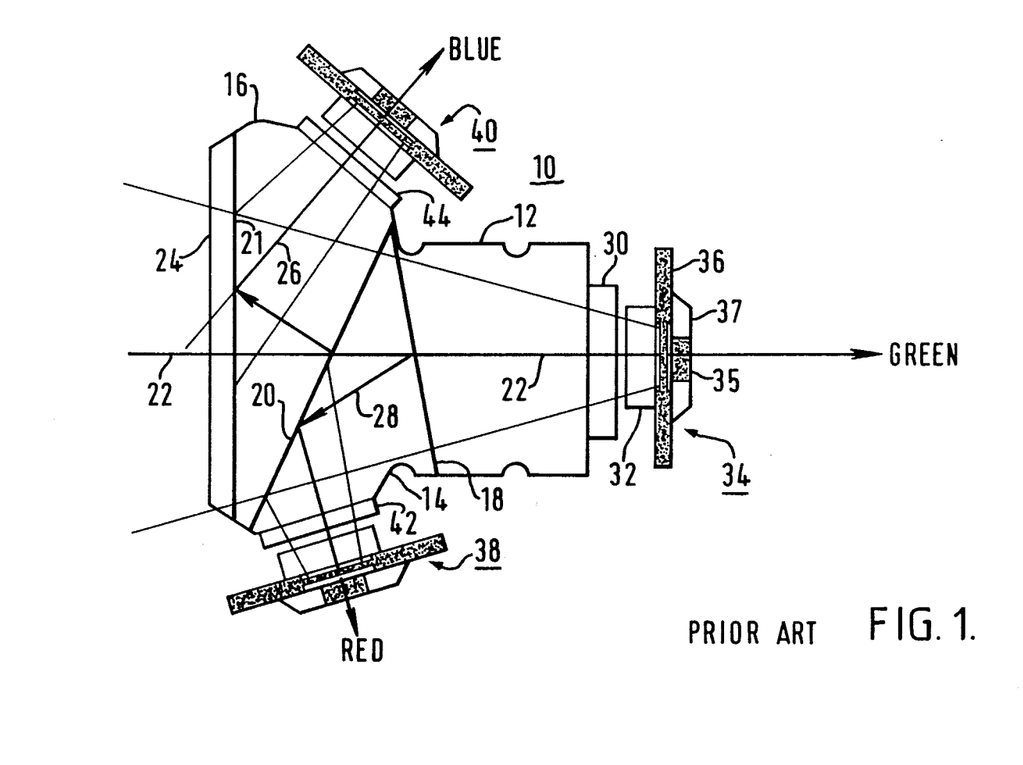
FIG. 1 illustrates a plan view of a prior-art prism.

FIG. 1 illustrates in plan view a prior-art prism 10 consisting of optical glass blocks 12, 14 and 16 with interface areas 18 and 20 therebetween. Light from a source (not shown) enters the prism along an optical axis 22 at an input port 24 lying along the left edge (as illustrated in FIG. 1) of portion 16 of the prism. This light represents a scene to be televised and may include red, green and blue color components. The blue component of the light passing through portion 16 of the prism is reflected along an axis 26 by interface area 20 and a reflective surface 21 of input port 24, while the remaining yellow portion of the light from the scene passes into portion 14 of the prism. The red component of the yellow light passing through portion 14 of the prism is reflected along an axis 28 by interface area 18 and interface area 20. The remaining green component of the incident light from the scene continues along axis 22 through interface surface 18 and into portion 12 of prism 10.

The separated green light emerges from an output port 30 of prism 10 and enters a window 32 of a solid-state imaging device designated generally as 34. Imaging device 34 as illustrated is a charge-coupled device (CCD) intended for multiple line scanning of a raster. CCD 34 includes a rigid non-conductive integrated-circuit (IC) body 36 which supports a light sensitive active portion of the CCD, which is to be illuminated by light from the scene, in a position centered with respect to axis 22. A thermo-electric cooling device 35 conducts heat away from the CCD to a heat conductive cover 37. Similarly, red and blue CCD imagers 38 and 40 are positioned to receive the red and blue components of the incoming light at red and blue prism output ports 42 and 44.

Since interface area 20 is required to have a blue reflective characteristic within portion 16 and a red reflective characteristic within portion 14 of prism 10, an air gap is required between portions 14 and 16. In order that light passing through the interface area not be disturbed, bonding of portions 14, 16 and 18 to form prism 10 must be done around the periphery of interface areas 18 and 20. This results in an assembled prism having relatively weak structural integrity and therefore prone to breakage due to thermal and mechanical stresses.

The present inventor realized that such a prior art prism may have difficulty maintaining its own structural integrity under even relatively low levels of thermal and mechanical stress, and is further stressed when required to support direct mounting of solid-state imagers to the prism's output ports. In accordance with the principles of the present invention, mounting plates are attached to opposite sides of the prism which are mutually orthogonal to the interface areas 18 and 20 for adding structural integrity to the prism portions 14, 12 and 16 and simultaneously serve as a uniform reference plane and mounting structure for the solid-state imagers.

Figure 2:
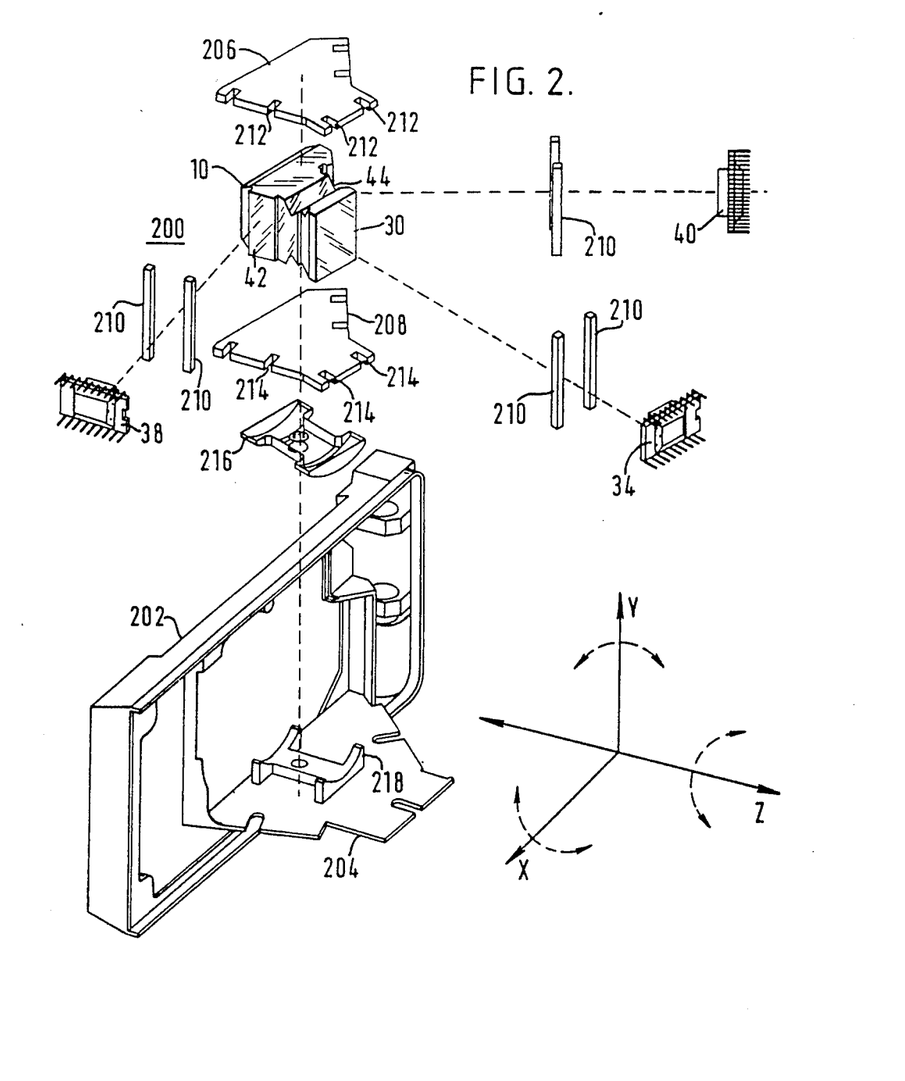
FIG. 2 illustrates an exploded view of a prism and imager mounting assembly constructed in accordance with the invention.

FIG. 2 illustrates an exploded view of the prism and CCD mounting arrangement in accordance with the invention. The prism 10 is of the type suitable for use with half-inch image pick-up tube devices. The red, green and blue CCD imagers 38, 34 and 40 are positioned with the active portion of the imagers facing the output ports 42, 30 and 44, respectively, of prism 10. The precision of the positioning of the imagers with respect to the focused images provided at each output port must be such that the electronic signals provided at the output of the imagers correspond to proper registration of the three separated images.

When using tube-type sensors, the raster position, size and geometry are individually adjustable, as well known in the art. Thus, while basic mechanical alignment is important, there is some room for adjustment of registration after assembly by electronic and magnetic means. The CCD sensor, however, has a fixed raster. The patterns used to define CCD elements in the sensor are determined by photolithography and define the position of the raster. Consequently, except for small timing variations, there is very little one can do electronically to correct misregistration in a solid-state camera. Substantially all registration must be set mechanically during assembly. The mechanical registration must be accurately performed and means must be provided for maintaining the accuracy of the mechanical registration during the life of the solid-state imagers. Additionally, thermal effects can change the size of the mechanical mounting assembly which would result in optical and electrical misregistration. The mechanical mounting assembly must be structured in a manner which minimizes misregistration resulting from thermal effects.

A prism mounting assembly 200 is mounted in a camera body 202 on a mounting plate 204 which is located directly behind an opening in camera body 202 through which a lens (not shown) focuses a scene on the input port of prism 10. Two identically dimensioned mounting plates 206 and 208 are securely attached to the top and bottom sides of prism 10. Since the mounting of plates 206 and 208 are to sides of prism 10 which are orthogonal to the interface planes of the optical blocks of prism 10, the plates greatly enhance the structural integrity of the prism. Plates 206 and 208 are preferably made of a nickel-iron alloy, such as Kovar (a trademark of Westinghouse Electric Corp.) which closely matches the coefficient of thermal expansion of the prism. When the coefficients of thermal expansion of mounting plates 206 and 208 closely match that of the prism, plates 206 and 208 can be attached to prism 10 in a permanent manner by bonding with a rigid epoxy, such as EPO-TEX 320, manufactured by Epoxy Technology Inc. 14 Fortune Dr., Billercia, Mass.

Figure 3:
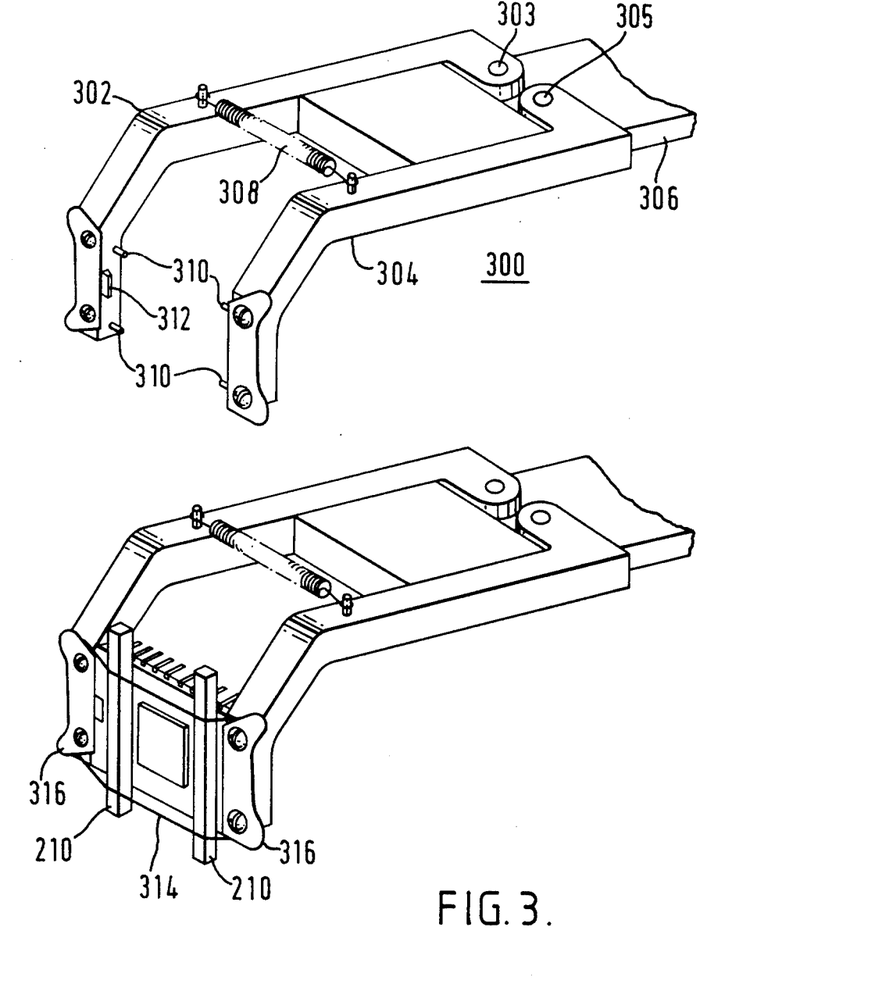
FIG. 3a and 3b illustrate a manipulator useful in mounting the imagers to a prism assembly in accordance with the invention.

Plates 206 and 208 include around their peripheries means for aligning the red, green and blue imagers with respect to each other in the optical paths of their corresponding output ports of prism 10. More specifically, plates 206 and 208 serve as uniform reference planes for the imager mounting and include rectangular cut-outs or notches around their peripheries. Sets of two cut-outs 212 and 214 in each of mounting plates 206 and 208, respectively, are located adjacent to either side of each light output port of prism 10. The cut-outs are dimensions for a relatively tight fit of the upper and lower ends of support bars 210, two of which are used to support each of the CCD imagers. During assembly a mechanical apparatus, such as a micro-manipulator (described with respect to FIG. 3), grasps green imager 34 and two support bars 210, which bars are held on either side of the window 32 of imager 34. The manipulator is then used to precisely position the imager and its support bars 210 within notches 212 and 214 of mounting plates 206 and 208, respectively, for centering the light sensitive active portion of green imager 34 with the optical axis 22 of the green output port 30 of prism 10.

With this type of mounting arrangement, maximum flexibility is provided for the precise positioning of the imagers. More specifically, six axes or degrees of freedom are provided as indicated in by the coordinate axes of FIG. 2. These degrees of freedom are three in the lateral directions, illustrated as coordinate axes X, Y and Z and three angular axes illustrated by the dashed arrows as tilt in the X plane, tilt in the Y plane and rotation about the Z axis. All six degrees of freedom must be constrained individually and uniquely for the imagers to be positioned for correct registration. In the arrangement of the invention, mounting plates 206 and 208 advantageously serve as uniform reference planes for locating notches 212 and 214 and support bars 210 allow a positioning of the solid-state imagers in accordance with their individual and unique requirements. Once the manipulator has positioned green imager 34, the central portions of support bars 210 associated therewith can be epoxied to imager 34 and epoxy can be used for bonding the ends of support bars 210 securely into cut-outs 212 and 214. Support bars 210 are also preferably made of a material which closely matches the thermal expansion of prism 10 in order that differential thermal expansion among the components of prism assembly 200 is minimized. Additionally, a rigid epoxy can also be used for maintaining long term stability of the imager positioning. In a preferred embodiment, support bars 210 are made of glass in order that they may be more easily broken than if made of Kovar, in order that an imager may be replaced if it becomes inoperative.

During assembly, the input port of prism 10 is illuminated with light from a scene including a crosshatch pattern or equivalent test pattern. Green imager 34 is bonded to the output port as previously described and connected by appropriate interface electronics to a television display monitor. The monitor will display a the test pattern. Since imager 34 is positioned symmetrically on the main optical axis (the green axis of prism 10, the green channel is thereafter considered the reference channel.

The assembly continues by connecting the signal output of one of the other imagers to the monitor and mechanically applying that imager to a corresponding light output port, also using support bars 210 which are held adjacent to the window of the imager by a manipulator and then positioned in cut-outs 212 and 214 of mounting plates 206 and 208 which are adjacent the corresponding light output port. The signal output of the second imager creates an image of the test pattern which is electrically superimposed on the image generated from the green signal. For example, if red imager 38 is to be mounted next, the monitor is viewed as the manipulator positions support bars 210 supporting imager 38 within the notches 212 and 214 of mounting plates 206 and 208 until the monitor raster displays the red-derived image superimposed on the green-derived image as exactly as desired. When so superimposed, imagers 38 and 34 are in correct registry, and epoxy can be applied for bonding support bars 210 to imager 38 and for bonding the ends of support bars 210 within the cut-outs of mounting plates 206 and 208 which are adjacent the red output port 42 of prism 10. Similarly, the blue imager 40 and support bars 210 are held by a manipulator and precisely positioned for correct registration with the green and red imagers and appropriately epoxied in place for completing the imager mounting.

A mounting block 216 is bonded to the lower surface of mounting plate 214 using a relatively flexible bonding material such as silicone rubber for securing to a bracket 218 on support plate 204 for mounting the prism assembly 200 on camera body 202.

The described imager mounting arrangement is particularly advantageous since the mounting plates add structural integrity to the optical blocks of prism 10 and also include cut-outs aligned with each of the output ports for supporting the imagers at precise locations with respect to the optical path of each light output port. The cut-outs can be formed in plates 206 and 208 using a unitary die, thus enhancing their accurate positioning with respect to each other. The mounting plates and support bars are made of a material which closely matches the coefficient of thermal expansion of prism 10 and thus "breathe" with the expansion and contraction of prism 10 in response to thermal conditions. Consequently, a rigid bonding material can be used between the mounting plates 206 and 208 and prism 10 and also between the ends of support bars 210 and the mounting plates. This results in a highly stable mounting arrangement for the CCD imagers which provides long term stability and enhances the structural integrity of the optical assembly. A solid-state camera constructed in accordance with the invention has achieved intercolor accuracy of better than 0.10 percent at the center of the raster. This value is stable over the entire expected temperature range of operation and for the life of the camera.

Figure 3A:
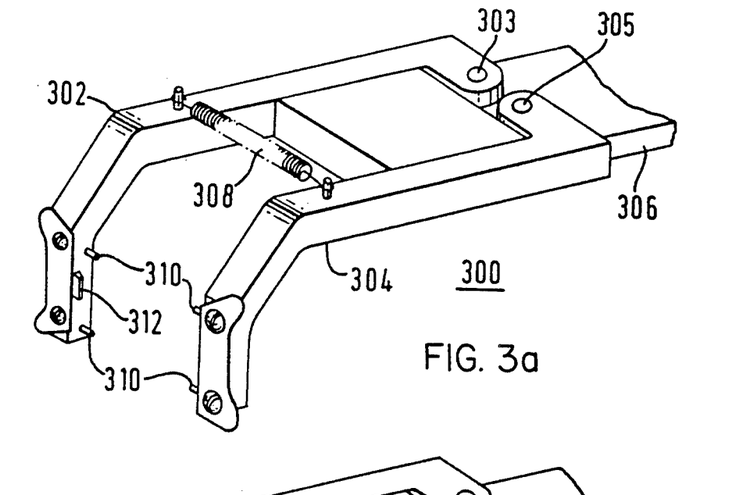
Figure 3B:
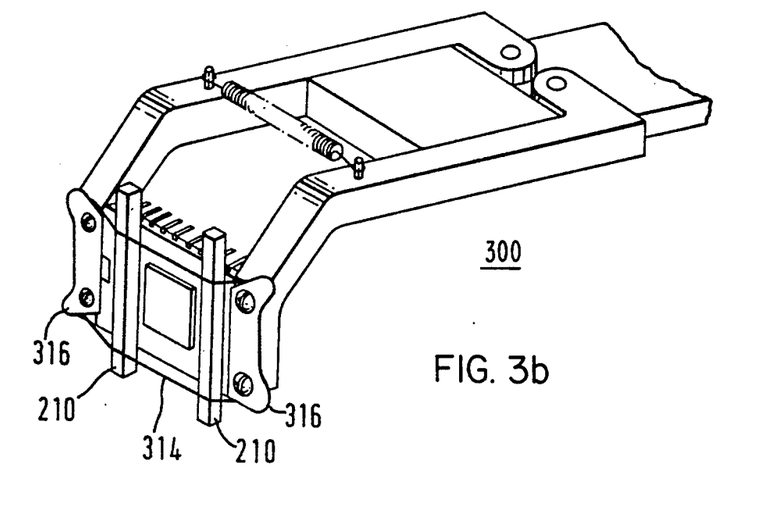

FIGS. 3a and 3b illustrate a manipulator 300 useful in mounting the CCD imagers to the prism assembly 200 of FIG. 2. Manipulator 300 includes two arm or jaw portions 302 and 304 which are hinged at one end to a support 306 by means of pins 303 and 305, respectively. A spring 308 near the central portion of jaws 302 and 304 provides tension for urging the free ends of jaws 302 and 304 together. At the free end of jaws 302 and 304 are support pins 310 for supporting the integrated circuit (IC) package including the CCD imager. A locating tab 312 on jaw 302 mates with a similarly dimensioned depression in the body of the IC package for correctly positioning the IC between jaws 302 and 304. Support bars 210 are positioned on either side of the window of the CCD and held in place by an elastic band 314. Elastic band 314 is held to the ends of jaws 302 and 304 by protruding members 316. Support 306 is connected to a mechanical micromanipulator assembly (not shown) of conventional design for moving manipulator 300 with six degrees of freedom and a precision of a fraction of a micron. Next, the bars 210 held by the elastic band 314 to either side of the CCD window of the IC, are precisely positioned into the cut-outs 212 and 214 of mounting plates 206 and 208 as previously described with respect to FIG. 2. Thereafter, support bars 210 are epoxied to the IC package and mounting plates and the elastic band 314 is cut and the manipulator 300 is operated to release the mounted imager. Although not shown, a thin-walled tubular rubber frame can be placed around the CCD window and dimensioned to fit between the body of the integrated circuit and the output port of prism 10 to serve as a dust cover for protecting the light sensitive portion of the imager from accumulating thereon airborne debris.

Figure 4:
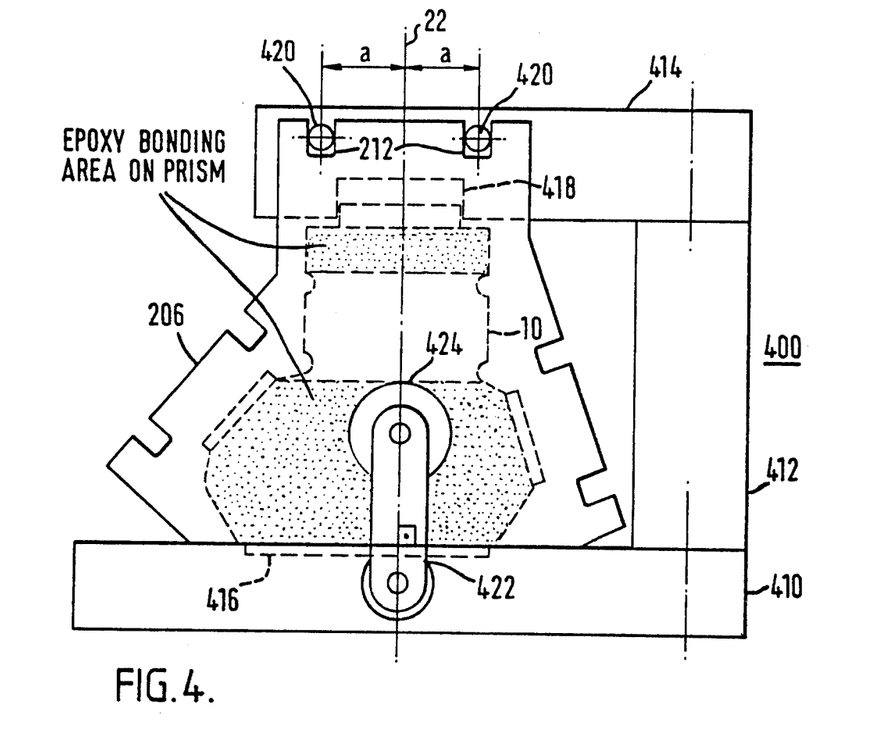
FIG. 4 illustrates apparatus useful in constructing a prism mounting assembly in accordance with the invention.

FIG. 4 illustrates a fixture 400 for assembling the mounting plates to the top and bottom of prism 10 (illustrated in phantom behind mounting plate 206). Fixture 400 includes a base 410, a vertical support 412 and a top portion 414. Base 410 includes a depression 416 which matches the dimensions of the light input port of prism 10. Top portion 414 includes a depression 418 for receiving the green light output port 30 of prism 10. Depressions 416 and 418 precisely locate prism 10 within assembly fixture 400. Top portion 414 also includes two locating pins 420, each positioned a distance "a" from the optical axis 22 of the green output port, for precisely locating the cut-outs 212 of mounting plate 206 to be adjacent each corresponding light output port of prism 10. During assembly, epoxy is applied to the side of the imager to which the mounting plate is to be bonded, the prism is positioned in assembly fixture 400 and the mounting plate is placed against prism 10 at a position determined by locating pins 420 and cut-outs 212. A hinged support arm 422 including a pad portion 424 at its free end holds mounting plate 206 against the side of prism 10 until the epoxy has hardened. The area where the epoxy is applied to the prism is indicated by stipple shading. Mounting plate 208 is bonded to prism 10 in a similar manner.

Figure 5:
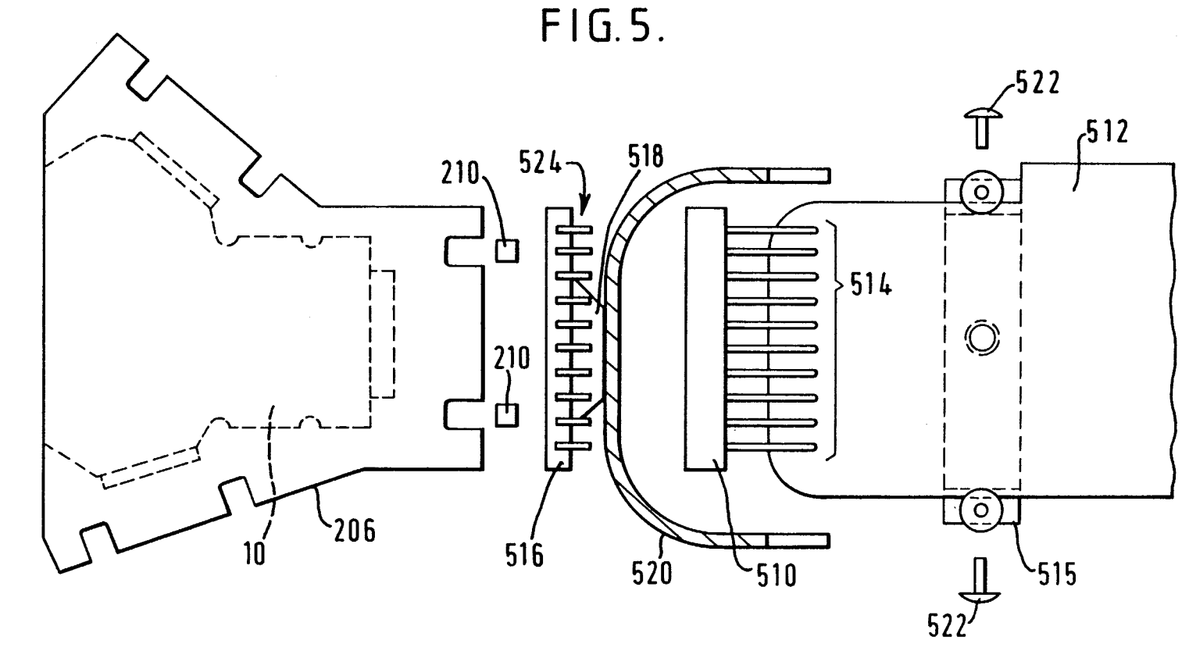
FIG. 5 illustrates the manner in which electrical connections are made to the imagers of the prism assembly of FIG. 2.

FIG. 5 illustrates the manner in which electrical connections can be made to the mounted imagers. To minimize the application of mechanical stress to the prism assembly, a standard multipin IC socket 510 is connected to the circuitry of a printed circuit (PC) board 512 via flexible conductors 514. A "Y" shaped bracket 515 is used for supporting the PC board between its branched portions, and the unbranched portion (not shown) of "Y" shaped bracket 515 can be mounted to the support plate 204 of camera body 202. The illustrated solid-state imager 516 includes a thermoelectric cooling package 518. The central portion of a copper braid or strap 520 is bonded to cooling package 518 and the ends of strap 520 can be connected to bracket 515 by screws 522 for conducting heat away from imager IC package 516. An array of electrical contact pins 524 of the imager IC package 516 is adapted to mate with IC socket 510.

Figure 6:
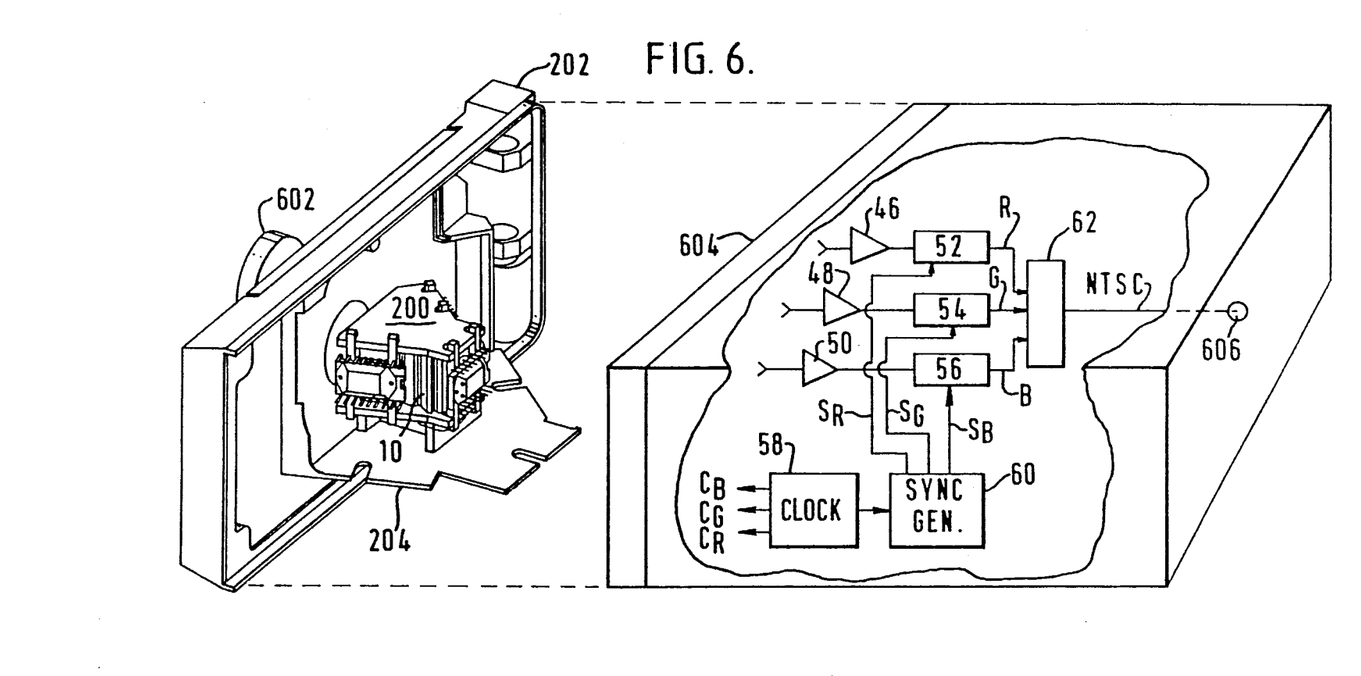
FIG. 6 illustrates in block diagram form a solid-state camera including a prism mounting assembly in accordance with the invention.

FIG. 6 illustrates in combined pictorial and electrical block-diagram form a solid-state imager camera including a prism mounting structure in accordance with the invention. An assembled prism structure 200 is illustrated mounted on the support plate 204 of camera body 202. A lens 602 is also attached to camera body 202 for focusing radiant energy representative of a scene to be televised onto the input port of prism 10 through an opening in camera body 202. A rear frame portion 604 is illustrated for mating with the front end frame portion 202 using screws (not shown).

The electronic portion of the solid-state imager camera of FIG. 6 includes circuitry, well known to those skilled in the art, which is suitable for use in a television camera including a prism mounting assembly according to the invention. Signal preamplifiers 46, 48 and 50 are coupled to the red, green and blue imagers 38, 34 and 40, respectively, of assembly 200 for amplifying the signals therefrom and for applying them to signal processing circuits illustrated as blocks 52, 54 and 56, respectively. The processing includes ordinary camera signal processing which may include shading, dropout correction, gamma correction, clamping and the like. A clock signal generator 58 develops clocking signals $C_R$, $C_B$ and $C_G$, as known in the art, which are applied for operating the red, blue and green imagers. A sync generator 60 develops synchronizing signals $S_R$, $S_G$ and $S_B$ which are applied to signal processing circuits 52, 54 and 56 for the insertion of sync and blanking signal components for producing R, G and B baseband video signals. The R, G and B signals are applied to a block 62 including a matrix which generates Y, I and Q signals in known fashion. A modulator (not shown) within block 62 modulates the I and Q signal components onto a subcarrier in known fashion for providing at an output terminal 606 a composite color television signal, such as an NTSC signal for connection, to a utilization means (not shown) such as a video tape recorder (VTR).

Figure 7A:
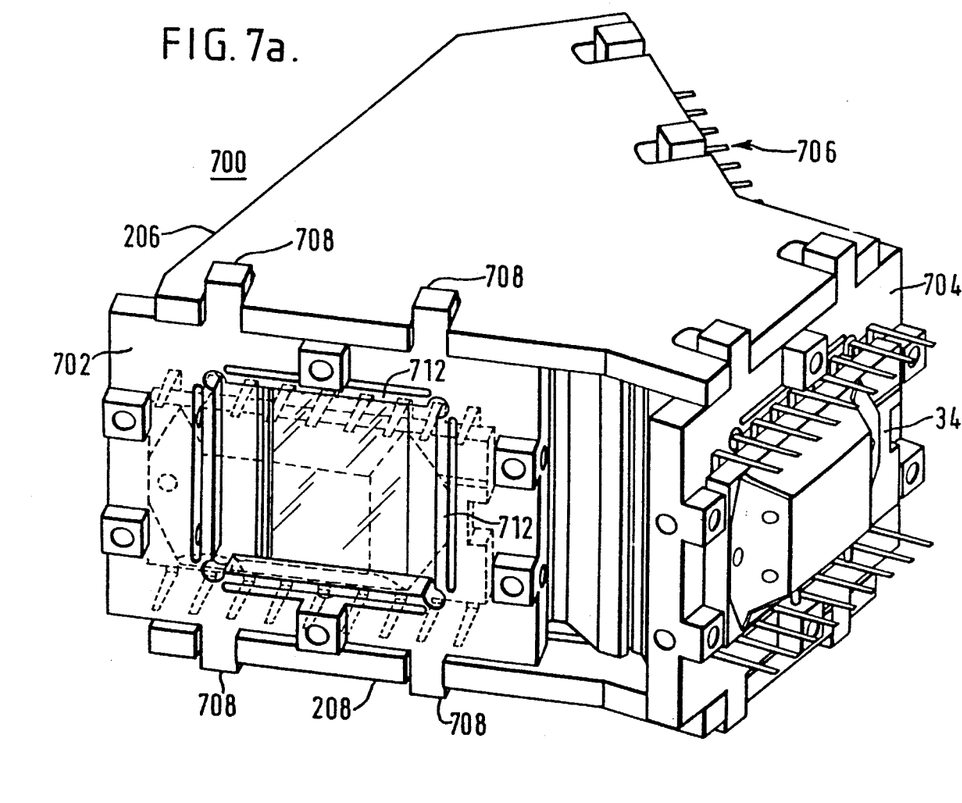
FIGS. 7a–7c illustrate an alternative embodiment of the prism mounting assembly in accordance with the invention.
Figure 7B:
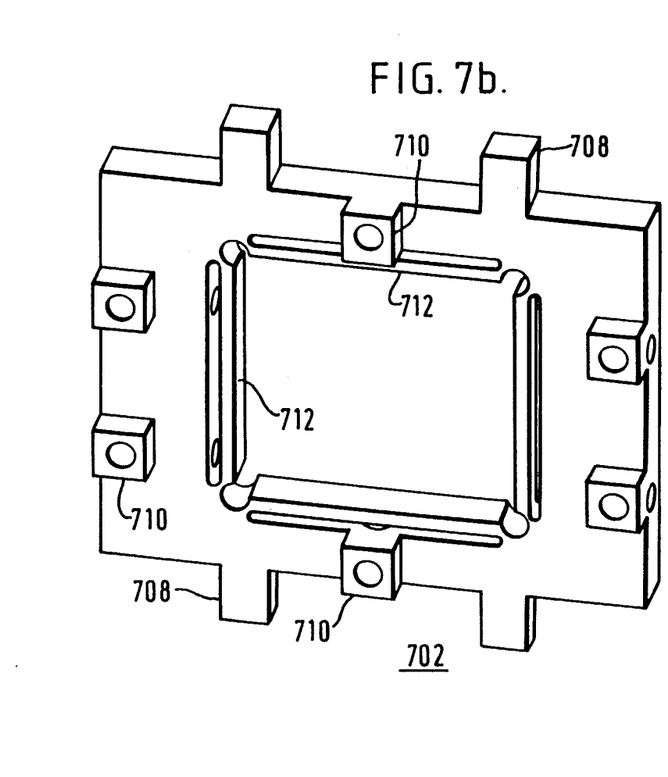
Figure 7C:
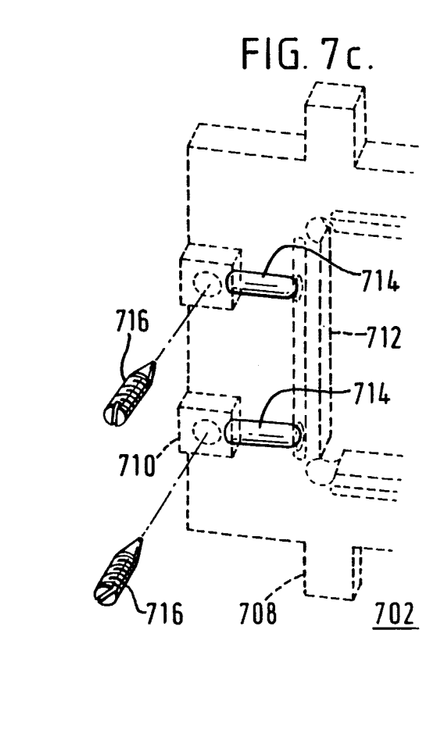

An alternative mounting arrangement is illustrated in FIGS. 7a, 7b and 7c. In FIG. 7a a prism assembly 700 illustrated including three support plates 702, 704 and 706 for supporting the red, green and blue imagers. Support plate 702 is illustrated separately in FIG. 7b and in FIG. 7a in assembly 700 with the red imager shown in phantom. Support 702 has a generally rectangular frame including protrusions 708 which align with the cut-outs of mounting plates 206 and 208. Support frame 702 includes a centrally located rectangular opening which is aligned by protrusions 708 to be centered with the optical axis of the red light output port of prism 10 for allowing red light from the scene to pass to the light sensitive active image area of red imager 38 when mounted on support 702. Protrusions 708 also provide general positioning of the imager by contact with the sides of the image IC package. The window of the red imager protrudes into the rectangular opening of frame 702. The imager and support plate 702 are assembled to mounting plates 206 and 208 in a manner similar to the mounting of the support bars to plates 206 and 208, previously described with reference to FIG. 2. In this alternative embodiment however, support frame 702 include means for adjusting the position of the imager after the prism assembly has been bonded. As shown more clearly in FIG. 7b, support frame 702 includes cut-outs spaced near and parallel to its rectangular inner opening for creating four flexible side beams 712. Beams 712 can be deflected or moved via plungers 714 driven by the conical ends of screws 716 threaded into protrusions 710. As illustrated in FIG. 7c, wherein frame 702 is shown in phantom, one end of each plunger 714 contacts the flexible beam 712 and the other end of plunger 714 extends through a hole in a side wall of a threaded vertical opening in protrusion 710. Screw 716 having a conically-shaped tip is designed for threading into protrusion 710 so as to apply force on plunger 714 which varies with the depth that screw 716 is screwed into protrusion 710. Thus, adjustment of the depth of screw 716 provides force onto plunger 714 which is transmitted by plunger 714 to deflect flexible beams 712. Similar plungers and conically-shaped tipped screws are provided for each protrusion 710 resulting in an adjustable mounting support with lateral movement in the X and Y planes and rotation about the Z axis. Support plate 704 is illustrated with the green imager 34 mounted thereon and properly positioned with respect to the optical axis of the green output port of prism 10.

Other embodiments of the invention will be obvious to those skilled in the art. For example, it is not necessary that the mounting plates be bonded to the prism and they can be attached by other means such as screws or clamps. Additionally, screws, clamps or adhesives other than epoxy could be used for attaching the support bars or the support frame to the mounting plates. It is not necessary that the prism be comprised of several pieces of glass and the mounting arrangement of the invention can also be used for mounting imagers to prisms which do not include airgaps or are of one piece construction.

What is claimed is:

1. A mounting assembly for use in mounting at least one image transducing means to a light output port of a light splitting prism, comprising:
   a first mounting plate having upper and lower surfaces, said lower surface being securely attached to one side of said prism which is orthogonal to the plane of said light output port;
   a second mounting plate having upper and lower surfaces, said upper surface being securely attached to a side of said prism opposite said one side;
   first and second alignment means located about the periphery of said first and second mounting plates, respectively, said first and second alignment means each being physically located so as to be adjacent said light output port; and
   support means having first and second ends coupled to said first and second alignment means, respectively, for physically supporting said image transducing means external to said prism and in the optical path of said light output port.

2. A mounting assembly in accordance with claim 1 wherein materials used for the construction of said prism, said mounting plates and said support means have substantially similar thermal expansion properties.

3. A mounting assembly in accordance with claim 2 wherein said first and second alignment means each comprise first and second cut-outs extending into said first and second mounting plates from the peripheries thereof and located in said mounting plates adjacent opposite sides of said light output port.

4. A mounting assembly in accordance with claim 3 wherein said support means comprises two bars positioned on opposite sides of a light sensitive portion of said image transducing means.

5. A mounting assembly in accordance with claim 4 wherein said bars each have a rectangular cross section and said cut-outs are of rectangular shape corresponding to said rectangular cross section.

6. A mounting assembly in accordance with claim 5 wherein a central portion of said bars is bonded to said image transducing means at opposite sides of said light sensitive portion and the ends of said bars are bonded to said cut-outs in said first and second mounting plates.

7. A mounting assembly in accordance with claim 6 wherein a relatively rigid epoxy comprises said bonds.

8. A mounting assembly in accordance with claim 3 wherein said support means comprises a frame having an adjustably positionable center opening for supporting said image transducing means.

9. A mounting assembly in accordance with claim 8 wherein said frame includes two spaced-apart protrusions on each of two opposite sides thereof for engagement with the first and second alignment means of said first and second mounting plates, respectively.

10. In a color television camera including a light splitting prism including a light input port and at least one light output port, said prism having a first light transmissive prism portion including said light input port and also having a first planar interface port, the planes of said input and first interface ports being orthogonal to first and second mutually opposite sides of said prism, said prism also having a second light-transmissive prism portion including a second planar interface port adjacent said first interface port of said first light-transmissive portion, said second light-transmissive portion being bonded in a predetermined position relative to said first light-transmissive portion by bonding about the peripheries of said first and second interface ports, said bonded first and second prism portions being subject to undesirable unbonding and movement therebetween in response to relatively low level thermal or mechanical stresses, said camera also including a mounting assembly for mounting at least one image transducing device external to said prism and in the optical path of said light output port in a manner which aids the structural integrity of the bond of said prism portions and which reduces thermal and mechanical stress to the prism resulting from mounting said image transducing device, said mounting assembly comprising:
 a first mounting plate having upper and lower surfaces, said lower surface being securely attached to said first side of said first and second mutually opposite sides of said prism;
 a second mounting plate having upper and lower surfaces, said upper surface being securely attached to said second side of said first and second mutually opposite sides of said prism;
 first and second alignment means located about the peripheries of said first and second mounting plates, respectively, and adjacent said light output port of said prism; and
 support means coupled to said first and second alignment means for supporting said image transducing device external to said prism and in the optical path of said light output port.

11. A mounting assembly in accordance with claim 10 wherein materials used for the construction of said prism, said mounting plates and said support means have substantially similar thermal expansion properties.

12. A mounting assembly in accordance with claim 10 wherein said first and second alignment means each comprise first and second cut-outs extending into said mounting plates from the peripheries thereof and located in said mounting plates adjacent opposite sides of said light output port.

13. A mounting assembly in accordance with claim 10 wherein said support means comprises two bars positioned on opposite sides of a light sensitive portion of said image transducing means.

14. A mounting assembly in accordance with claim 13 wherein a central portion of said bars are bonded to said image transducing means at opposite sides of said light sensitive portion and the ends of said bars are bonded to said cut-outs in said first and second mounting plates.

15. A mounting assembly in accordance with claim 11 wherein said support means comprises a frame having an adjustably positionable center opening for supporting said image transducing means.

16. A mounting assembly in accordance with claim 15 wherein said frame includes two spaced-apart protrusions on each of two opposite sides thereof for engagement with the first and second alignment means of said first and second mounting plates, respectively.

17. An improved television camera, comprising:
 a light-splitting prism, said light-splitting prism in turn comprising first and second optical glass blocks, said first and second glass blocks being bonded together to form an interface plane, said interface plane including a planar gap between said glass blocks through which gap light passes, said interface plane also including a bonding region surrounding said gap, which bonding region includes an adhesive means for maintaining said glass blocks in a desired relative orientation to maintain said gap;
 prism mounting means coupled to said prism for mounting said prism in said camera;
 imager mounting means coupled to said prism for mounting a television imager to said prism, whereby environmental shocks and thermal stresses due to the prism and imager mountings are coupled to said glass blocks tending to cause said first and second blocks to separate along said bonding region;
 wherein the improvement lies in that:
 said prism mounting means includes a mounting plate adhesively bonded to surfaces of said first and second glass blocks and to said camera for mounting said prism to said camera and for providing strength across said interface plane thereby tending to prevent separation of said first and second glass blocks, said prism mounting means further comprising imager mount locating means coupled to an edge of said prism mounting means adjacent a light output port of said prism; and
 said imager mounting means is coupled to said imager mount locating means for supporting said imager mounting means in a predetermined position adjacent said output port.

18. The television camera of claim 17 wherein said imager mount locating means comprises cut-outs extending into said mounting plate from its periphery and located in said mounting plate adjacent opposite sides of said light output port.

19. The television camera of claim 17 wherein said surfaces of said first and second glass blocks which are bonded to said mounting plate are orthogonal to said interface plane.

20. The television camera of claim 19 wherein a relatively rigid adhesive is used for bonding said mounting plate to said orthogonal surfaces of said first and second glass blocks and a relatively resilient adhesive is used for bonding said mounting plate to said camera.

21. A television camera in accordance with claim 18 further including an additional mounting plate adhesively bonded to surfaces of said first and second glass blocks which are opposite the surfaces to which said first-mentioned mounting plate is adhesively bonded.

22. A television camera in accordance with claim 21 wherein said additional mounting plate includes cut-outs in its periphery which are aligned with said cut-outs of said first-mentioned mounting plate.

23. A television camera in accordance with claim 22 wherein said imager mounting means comprises two bars positioned on opposite sides of a light sensitive portion of said television imager.

24. A television camera in accordance with claim 23 wherein said bars each have rectangular cross sections and said cut-outs are of rectangular shape corresponding to said rectangular cross section.

25. A television camera in accordance with claim 24 wherein a central portion of said bars is bonded to said television imager at opposite sides of said light sensitive portion and the ends of said bars are bonded to said cut-outs in said first-mentioned and additional mounting plates.

26. A television camera in accordance with claim 25 wherein said bar bonds consist of relatively rigid epoxy.

27. A television camera in accordance with claim 22 wherein said imager mounting means comprises a frame having an adjustably positionable center opening for supporting said television imager.

28. A television camera in accordance with claim 27 wherein said frame includes two spaced-apart protrusions on each of two opposite sides thereof for engagement with the cutouts of said first-mentioned and additional mounting plates, respectively.

29. A television camera in accordance with claim 22 wherein said first-mentioned and additional mounting plates include additional cut-outs associated with second and third light output ports of said prism and further imager mounting means which are bonded to corresponding cut-outs of said mounting plates to support second and third television imagers.

* * * * *